US012570408B2

(12) United States Patent
Hegenbart et al.

(10) Patent No.: US 12,570,408 B2
(45) Date of Patent: Mar. 10, 2026

(54) AIRCRAFT FUSELAGE AND METHOD FOR RELEASING A FUEL TANK FROM INSIDE THE AIRCRAFT FUSELAGE IN CASE OF EMERGENCY AS WELL AS AIRCRAFT

(71) Applicant: Airbus Operations GmbH, Hamburg (DE)

(72) Inventors: Matthias Hegenbart, Hamburg (DE); Hermann Benthien, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 18/896,136

(22) Filed: Sep. 25, 2024

(65) Prior Publication Data

US 2025/0108932 A1      Apr. 3, 2025

(30) Foreign Application Priority Data

Sep. 28, 2023      (EP) .................................... 23200510

(51) Int. Cl.
 *B64D 37/12*      (2006.01)
 *B64C 1/14*      (2006.01)

(52) U.S. Cl.
 CPC ............ *B64D 37/12* (2013.01); *B64C 1/1415* (2013.01)

(58) Field of Classification Search
 CPC .......... B64D 37/12; B64D 1/00; B64D 37/00; B64D 1/02; B64D 37/06; B64D 37/04; B64D 37/02; B64D 1/10; B64D 1/12; B64D 1/16; B64C 1/1415
 See application file for complete search history.

(56) References Cited

U.S. PATENT DOCUMENTS

| | | | |
|---|---|---|---|
| 2,623,721 A | 12/1952 | Harrington | |
| 2,977,853 A | 4/1961 | Gehrkens | |
| 4,306,693 A * | 12/1981 | Cooper .................. | B64D 37/12 244/140 |
| 4,426,050 A * | 1/1984 | Long ..................... | B64D 37/12 244/140 |
| 6,149,102 A | 11/2000 | Marasco | |

(Continued)

FOREIGN PATENT DOCUMENTS

| | | |
|---|---|---|
| CN | 110450955 B | 6/2023 |
| WO | 2021212070 A1 | 10/2021 |

OTHER PUBLICATIONS

Extended European Search Report issued in EP Application No. 23200510.8, dated Jan. 4, 2024, 10 pages.

*Primary Examiner* — Joshua D Huson
*Assistant Examiner* — Shanna Danielle Glover
(74) *Attorney, Agent, or Firm* — KDW Firm PLLC

(57) ABSTRACT

An aircraft fuselage for releasing a fuel tank from inside the aircraft fuselage in case of emergency includes an outer structure, a mounting device to releasably secure a sled device for carrying a fuel tank in an inside of the outer structure, and a first openable release door separating the inside from an outside of the outer structure, wherein the first release door is positioned in relation to the mounting device such that the fuel tank is released through the first release door when the mounting device releases the sled device. A method is disclosed for releasing a fuel tank from inside the aircraft fuselage in case of emergency as well as an aircraft including such an aircraft fuselage.

16 Claims, 5 Drawing Sheets

(56) References Cited

U.S. PATENT DOCUMENTS

| | | | |
|---|---|---|---|
| 2008/0103703 A1* | 5/2008 | Tichborne | G01F 9/008 |
| | | | 702/51 |
| 2013/0001364 A1 | 1/2013 | Cardell | |
| 2024/0367811 A1* | 11/2024 | Rosenkrantz | B64D 37/12 |

* cited by examiner

M

M0    M1    M2    M3    M4

1

AIRCRAFT FUSELAGE AND METHOD FOR RELEASING A FUEL TANK FROM INSIDE THE AIRCRAFT FUSELAGE IN CASE OF EMERGENCY AS WELL AS AIRCRAFT

TECHNICAL FIELD

The disclosure herein relates to a device as well as to an aircraft fuselage for releasing a fuel tank from inside the aircraft fuselage in case of emergency. The disclosure herein is furthermore concerned with an aircraft containing such an aircraft fuselage and a method for releasing a fuel tank from inside an aircraft fuselage in case of emergency.

BACKGROUND

It is very often necessary, especially on long range flights, for an aircraft to carry an additional supply of fuel to that normally required and installed in the aircraft. Such an additional fuel is generally carried in additional tanks on the outside of the aircraft, or, more particularly, for convenience and aerodynamic reasons, may be attached to the lower surface of the wing section. These tanks can be released or dropped off, thus reducing the load and drag factor on the aircraft or for safety reasons.

Various types of jettisonable fuel tank arrangements are known. Most prior art types of jettisonable fuel tank arrangements have been so constructed and located with respect to the aircraft body or fuselage as to provide a generally aerodynamically smooth, streamlined outer surface to the aircraft.

Typically, the jettisonable fuel tank is connected to a reserve fuel tank means carried by the aircraft, and wherein the valve means serves to normally maintain open fuel flow communication between the jettisonable fuel tank and the engine of the aircraft.

For example U.S. Pat. No. 4,306,693 describes an improved fuel tank system for aircraft, and more particularly, to jettisonable fuel tank means and related self-sealing valve means therefor. This jettisonable fuel tank can be dropped when the contained fuel is consumed.

Those known jettisonable fuel tanks may be difficult to be upgraded in existing aircrafts.

SUMMARY

According to the disclosure herein, this problem is solved in each case by the subject matters of the independent claims.

According to a first aspect of the disclosure herein, an aircraft fuselage for releasing a fuel tank from inside the aircraft fuselage in case of emergency is provided. The aircraft fuselage comprises an outer structure and a mounting device. The mounting device is configured to releasably secure a sled device for carrying a fuel tank in an inside of the outer structure. Moreover, the aircraft fuselage comprises a first openable release door which separates the inside from an outside of the outer structure, wherein the first release door is positioned in relation to the mounting device such that the fuel tank is released through the first release door when the mounting device releases the sled device.

According to a second aspect of the disclosure herein, an aircraft comprising an aircraft fuselage according to the first aspect of the disclosure herein is provided. Furthermore, the aircraft comprises a sled device for carrying a fuel tank. The sled device is releasably secured by the mounting device in an inside of the outer structure. In particular, the aircraft is configured as a passenger or cargo aircraft.

According to a third aspect of the disclosure herein, a method for releasing a fuel tank from inside an aircraft fuselage in case of emergency is provided. The method comprises opening a first release door which separates an inside from an outside of an outer structure of an aircraft fuselage. Further, the method comprises disconnecting a sled device for carrying a fuel tank, wherein the sled device is releasably secured by a mounting device in the inside of the outer structure from the mounting device such that the sled device releases the aircraft fuselage through the open first release door.

A fundamental concept of the disclosure herein is to separate a fuel tank, in particular a liquid hydrogen tank, in case of emergency like a hydrogen leakage, which cannot be stopped. Removing the fuel tank from the aircraft automatically and moving it into a safe distance is enabled. It is emphasized that the disclosure herein can be applied on ground as well as in flight. The fuel tank can be installed anywhere in the aircraft fuselage, for example in the front, in the middle, in the back or in a cargo compartment. In particular, the fuel tank is stored in an inner tank compartment of the outer structure separated from other areas of the aircraft fuselage. The sled device is not limited to carry the fuel tank, but can also carry any other good like a box, for example. A system for the separation of the sled device carrying the fuel tank, in particular a hydrogen tank separation system, is provided. The fuel tank can have a substantially cylindrical shape or any similar shape.

A particular advantage in the solution according to an aspect of the disclosure herein is that a fuel tank, which usually contains dangerous fluids that are easy flammable or explosive, for example, can operated more safely in an aircraft. When a problem with the fuel tank occurs that cannot be handled in the aircraft, the complete fuel tank can be removed from the aircraft to provide a safe further flight and/or landing.

Another advantage is that hydrogen can be stored in the fuel tank and used as fuel for the aircraft. Since liquid hydrogen can be explosive when combined with air, and only a small amount of energy is required to ignite the hydrogen, the disclosure herein provides a solution to handle it safely, in particular in the event of an emergency.

Advantageous embodiments and further developments emerge from the description with reference to the figures.

According to some aspects of the disclosure herein, the first openable release door or shoot out panel, respectively, is positioned on a lateral side of the outer structure. In particular such that the fuel tank slides out of the aircraft fuselage by a lateral force in relation to a longitudinal axis of the aircraft fuselage.

According to some further aspects of the disclosure herein, the mounting device comprises a rail system for guiding the sled device. Optionally, the rail system may include rollers or similar elements for improving a sliding of the sled device.

According to some further aspects of the disclosure herein, the mounting device comprises a reversible quick release element which locks the sled device in a secured status and is driven electro mechanically, magnetically, hydraulically or pneumatically to release the sled device. Therefore, the quick release element can be operated automatically and/or semi-automatically. For example, a hydrogen detection system can be positioned at or coupled to the mounting device and/or the first release door that when a hydrogen leak is detected the hydrogen detection system may activate the quick release element and the first release door. Furthermore, the quick release element and/or the first release door can be activated or controlled by an activation system or a control and steering unit, respectively.

According to some further aspects of the disclosure herein, the first openable release door is hinged to the outer structure and opened by a hydraulic, electro mechanical or pneumatic pivot mechanism, wherein a hinge axis of the hinged release door is substantially corresponding to a longitudinal axis of the aircraft fuselage. For example, the release door is configured as a conventional landing gear door, wherein its size and functionality is scalable to any demand. Such a demand could be being openable in great heights and/or a maximum flight speed.

According to some further aspects of the disclosure herein, the aircraft fuselage further comprises a second openable release door which is positioned on an opposite side of the outer structure with regard to the first release door. Thus, the fuel tank can also be released through the second release door. Releasing the fuel tank through the first or second release door can be chosen by a control unit or a user, in particular a pilot. Substantially, the second release door can be configured and hinged like the first release door.

According to some further aspects of the disclosure herein, at least one of both the first and second openable release door is configured reclosable, in particular reclosable during flight. Thus, an aerodynamic property of the aircraft fuselage is not influenced by a protruding release door and/or an uncovered opening.

Optionally, at least a section of the aircraft fuselage can be lined with a fire resistant lining for retaining flames. Alternatively or additionally, at least a section of an inner side of the outer structure can comprise a flame deflector shielding. Alternatively or additionally, a flameless venting device for retaining flames can be placed on an inner side of at least one of both the first and second openable release door and configured to cover an opening in the outer structure when the first or second release door is open.

A flameless venting device combines the techniques of explosion venting and flame arresting. A flameless venting device may comprise a vent panel, a flanged housing, and a flame arrestor element. The general principle is that during the early stages of an explosion the explosion vent cover opens, burnt and un-burnt dust and flame enter the flame arrestor element. Flame propagation beyond the flameless venting device is prevented by energy (heat) dissipation in the element, reducing the burning fuel below its ignition temperature. The dust is largely retained within the arrestor element and gases from the explosion are vented through the device into the external atmosphere around the flameless venting device.

There are several types of flameless venting devices. Furthermore, there are passive flameless venting devices that consist essentially of a cylinder closed at one end and open at the other. Surfaces of the flameless venting device may be fabricated from various layers of mesh, in particular of high temperature stainless steel mesh. The flameless venting device can be bolted onto the explosion vent on the vessel with its open end overlapping the vent aperture. With the mesh dust will be retained in the compartment and, because of heat absorption by the flamefilter; the flame from the explosion will be extinguished as it travels through the mesh. Only the safe discharge of post-combustion gases from the explosion is allowed. Advantages of flameless venting are flame extinguishment, dust retention, elimination of the need for explosion vent ducts and minimization of the vent relief area requirements for indoor venting. That means the 3-dimensional mesh arrangement acts as a heat sink that interrupts the explosion in mid-stream as well as an absorption of the pressure wave and dust that would normally be ejected by a vented explosion.

According to some further aspects of the disclosure herein, the fuel tank is fluidly connected to a standard fueling and transfer line of the aircraft when secured by the mounting device. The fuel tank supplies an engine of the aircraft with fuel.

According to some further aspects of the disclosure herein, the sled device comprises an accelerator for shooting out the sled device together with a fuel tank fixed to it. Optionally, the sled device may include rollers or similar elements for improving a sliding of the sled device on the rail system.

According to some further aspects of the disclosure herein, the accelerator is configured as a solid propellant rocket or solid rocket booster, respectively.

The solid propellant rocket or solid rocket is a rocket with a rocket engine that uses solid propellants like fuel, in particular plastic or resin material, and oxidizer, in particular nitrates or perchlorates. Solid fuel and oxidizer are homogeneously mixed and packed inside the rocket. A liner is provided between a shell and the propellant. The purpose of the liner is to protect the shell because high temperature will be generated during a combustion process. A solid grain mass burns in a predictable fashion to produce exhaust gases. A nozzle dimensions are calculated to maintain a design chamber pressure, while producing thrust from the exhaust gases. Once ignited, a simple solid rocket cannot be shut off, because it contains all the ingredients necessary for combustion within the chamber in which they are burned. More advanced solid rockets can be throttled, and also be extinguished, and then re-ignited by control of the nozzle geometry, or through the use of vent ports. Further, pulsed rockets that burn in segments, and that can be ignited upon command are available. Modern designs may also include a steerable nozzle for guidance, avionics, recovery hardware like parachutes, self-destruct mechanisms, APUs, controllable tactical motors, controllable divert and attitude control motors, and thermal management materials.

An advantage of the solid propellant rocket is that a force for the acceleration of the sled device does not need to be supported by the aircraft fuselage. Therefore, the force for the acceleration of the sled device is not transmitted to the outer structure and hence the aircraft fuselage is not pushed away. In an embodiment with a second release door, the second release door can be opened in addition to the first release door such that the exhaust gases can exit the aircraft fuselage better.

Furthermore, the solid propellant rocket can be configured to provide a long lasting acceleration such that the sled device is shot away from the aircraft fuselage a longer distance when the aircraft fuselage is on the ground and the sled device falls on the ground after being released from the aircraft fuselage. Thus, a detonation of the fuel tank could not harm the aircraft fuselage when the sled device is away the longer distance.

According to some further aspects of the disclosure herein, the sled device comprises at least two solid propellant rockets, which are located at opposite end regions of the sled device and oriented to opposite directions such that the sled device can be accelerated towards two opposite directions.

For example, the aircraft can further comprise a second fuel tank which is independent from the fuel tank and integrated into a wing of the aircraft. The fuel tank is configured as a cryogenic tank for storing hydrogen, for instance. The second fuel tank is configured for storing kerosene, for example.

Optionally, the aircraft can comprise a hybrid engine which is configured to be driven by different fuels that are supplied from the fuel tank and the second fuel tank via the standard fueling and transfer line. The fuel tank can store hydrogen and the second fuel tank can store kerosine, for example. Alternatively, the fuel tank and the second fuel tank can store the same fuel.

According to some further aspects of the disclosure herein, the method further comprises closing the first release door after the fuel tank has released the aircraft fuselage. In particular, the first release door is closed during flight with a regular flight speed or with a reduced flight speed. Furthermore, the first release door can be closed in any desired altitude.

According to some further aspects of the disclosure herein, disconnecting includes accelerating the sled device relative to the aircraft fuselage by an accelerator. Thus, the sled device can be shot/blown out away from the aircraft fuselage. In particular, when the accelerator is configured as a solid propellant rocket, the solid propellant rocket will be ignited and the fuel tank sled device will be shot out away from the aircraft fuselage.

Optionally, the method could start with a step of detecting a leakage of the fuel tank. The leakage can be detected by a user or a hydrogen detection system positioned at or coupled to the fuel tank, for example.

In some embodiments the method further comprises switching a fuel supply from the fuel tank to a second fuel tank which is independent from the fuel tank and not to be released.

BRIEF DESCRIPTION OF THE DRAWINGS

The disclosure herein is explained more specifically below on the basis of the example embodiments indicated in the schematic figures, in which.

DETAILED DESCRIPTION

Figure 1:
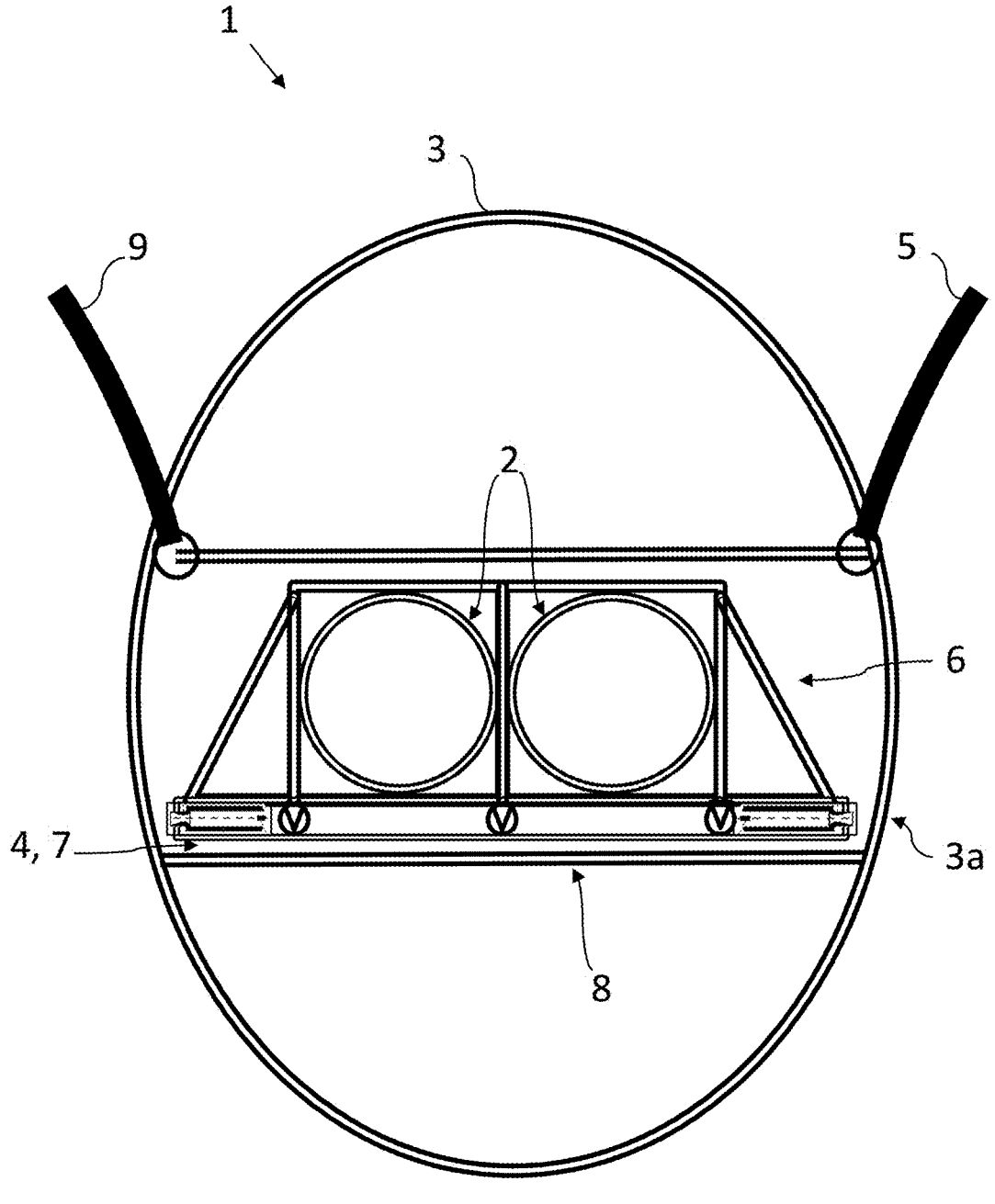
FIG. 1 shows a schematic illustration of an aircraft fuselage for releasing a fuel tank from inside the aircraft fuselage in case of emergency according to an embodiment of the disclosure herein.

The accompanying figures are intended to convey a further understanding of the embodiments of the disclosure herein. They illustrate embodiments and are used in conjunction with the description to explain principles and concepts of the disclosure herein. Other embodiments and many of the cited advantages emerge in light of the drawings. The elements of the drawings are not necessarily shown to scale in relation to one another. Direction-indicating terminology such as for example "at the top", "at the bottom", "on the left", "on the right", "above", "below", "horizontally", "vertically", "at the front", "at the rear" and similar statements are merely used for explanatory purposes and do not serve to restrict the generality to specific configurations as shown in the figures.

In the figures of the drawing, elements, features and components that are the same, have the same function and have the same effect are each provided with the same reference signs—unless explained otherwise.

FIG. 1 shows a schematic illustration of an aircraft fuselage 1 for releasing a fuel tank 2 from inside the aircraft fuselage 1 in case of emergency according to an embodiment of the disclosure herein.

The aircraft fuselage 1 comprises an outer structure 3, a mounting device 4, a first openable release door 5, a rail system 7, a reversible quick release element 8 and a second release door 9. The outer structure 3 can include a frame and a stringer.

The mounting device 4 is configured to releasably secure a sled device 6 for carrying a fuel tank 2 in an inside, in particular in an inner tank compartment, of the outer structure 3. Here, the illustrated sled device 6 carries two fuel tanks 2, for example, but is not limited to that number. Furthermore, the mounting device 4 comprises the rail system 7 for guiding the sled device 6. Optionally, the rail system 7 may include rollers (not shown) or similar elements for improving a sliding of the sled device 6. In particular, the rail system 7 is configured as a conventional cargo deck for storing cargo container and the like.

Moreover, the mounting device 4 comprises the reversible quick release element 8 which locks the sled device 6 in a secured status and is driven electro mechanically, or hydraulically to release the sled device 6. Therefore, the quick release element 8 can be operated semi-automatically. For example, a hydrogen detection system (not shown) can be positioned at or coupled to the mounting device 4 and/or the first release door 5 that when a hydrogen leak is detected the hydrogen detection system may activate a signal for informing a pilot. The quick release element 8 and the first release door 5 can be activated by the pilot. After activation by the pilot the sled device 6 is automatically released through the first release door 5.

The first openable release door 5 separates the inner tank compartment from an outside of the outer structure 3. The first release door 5 is positioned in relation to the mounting device 4 such that the fuel tank 2 is released through the first release door 5 when the mounting device 4 releases the sled device 6. Here, the first openable release door 5 is positioned on a lateral side 3*a* of the outer structure 3, in FIG. 1 it is the right hand side of the outer structure 3, such that the fuel tank 2 slides out of the aircraft fuselage 1 by a lateral force in relation to a longitudinal axis of the aircraft fuselage 1. Thereby, the first openable release door 5 is hinged to the outer structure 3 and opened by a hydraulic pivot mechanism. Here, the first release door 5 is illustrated in a fully open status. A hinge axis of the hinged release door 5 is substantially corresponding to the longitudinal axis of the aircraft fuselage 1. In particular, the first release door 5 is configured as a conventional landing gear door, wherein its size and functionality is scalable to any demand. In this example, the first release door 5 is hinged at an upper section of the first release door 5 such that the first release door 5 opens up.

The second openable release door 9 is positioned on an opposite side of the outer structure 3 with regard to the first release door 5. Substantially, the second release door 9 is configured as the first release door 5. In particular, the second release door 9 has the same size as the first release door 5 and is positioned in relation to the mounting device 4 such that the fuel tank 2 can also be released through the second release door 9 when needed. Releasing the fuel tank 2 through the first 5 or second release door 9 can be chosen by a control unit or a user, in particular the pilot.

Like the above-mentioned landing gear door, the first release door 5 and the second openable release door 9 are configured reclosable, in particular reclosable during flight.

Figure 2:
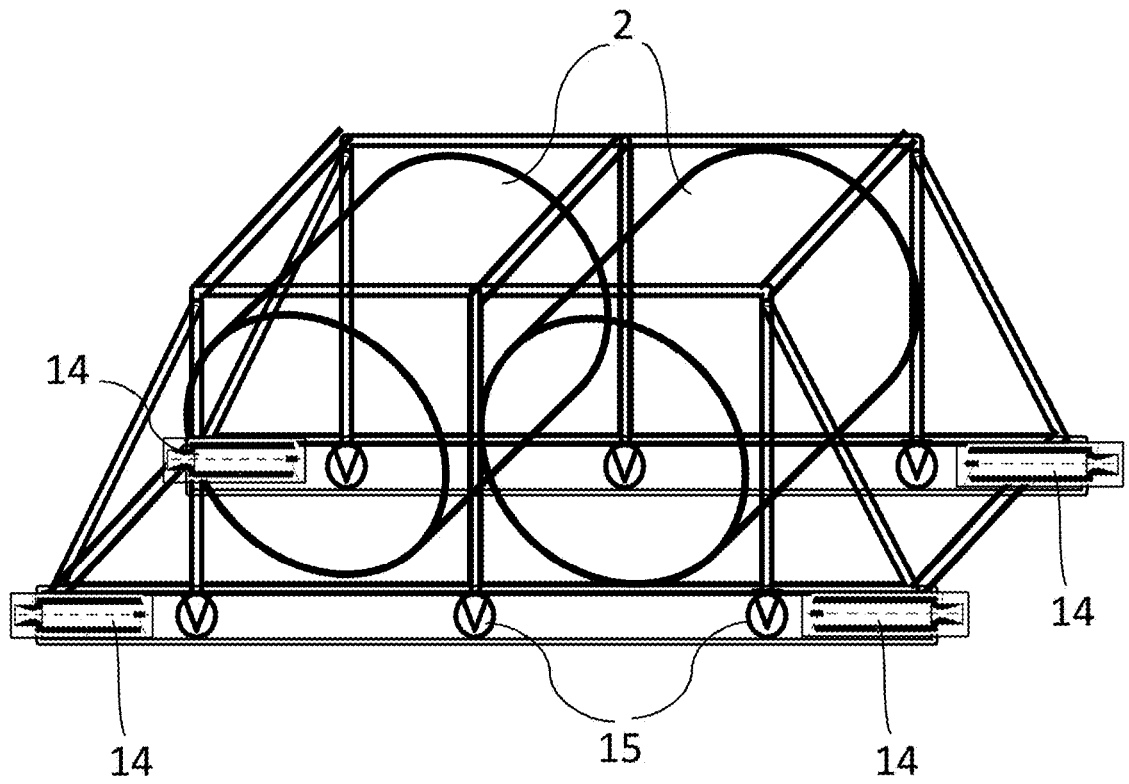
FIG. 2 shows a schematic illustration of a sled device carrying two fuel tanks according to a further embodiment of the disclosure herein.

FIG. 2 shows a schematic illustration of a sled device 6 carrying two fuel tanks 2 according to a further embodiment of the disclosure herein.

The example sled device 6 is configured for carrying two fuel tanks 2 that have a cylindrical shape. The two fuel tanks 2 are fixed on the sled device 6 by a rod assembly or frame, respectively. The sled device 6 comprises two slipper beams or guide rails, respectively, which are configured to slide in a rail system, in particular in the rail system 7. The sled device 6 is furthermore configured to be releasably secured by the mounting device 4 at the rail system 7.

Preferably, the sled device 6 comprises an accelerator 14 for shooting out the sled device 6 together with a fuel tank 2 fixed to it. The accelerator 14 can be configured as a solid propellant rocket (see FIG. 5). In FIG. 2, the sled device 6 comprises four accelerators 14, which are located at opposite end regions of the sled device 6 and oriented to opposite directions such that the sled device 6 can be accelerated towards two opposite directions. The two opposite directions correspond to a longitudinal axis of the two slipper beams, for example. The four accelerators 14 are arranged at each end region of the two slipper beams.

Additionally, the two slipper beams may comprise rollers 15 to improve sliding of the sled device 6.

Figure 3:
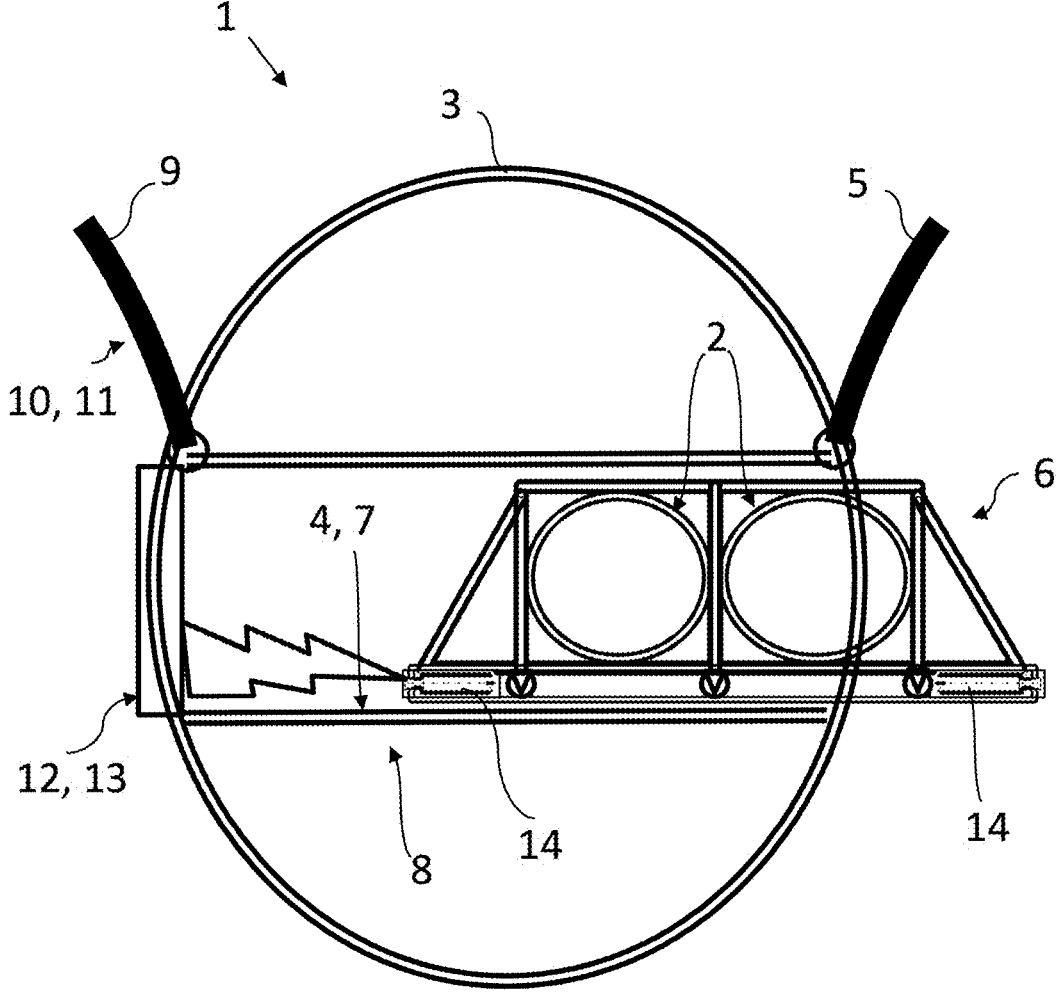
FIG. 3 shows a schematic illustration of an aircraft fuselage according to a further embodiment of the disclosure herein, wherein the sled device of FIG. 2 is released.
Figure 4:
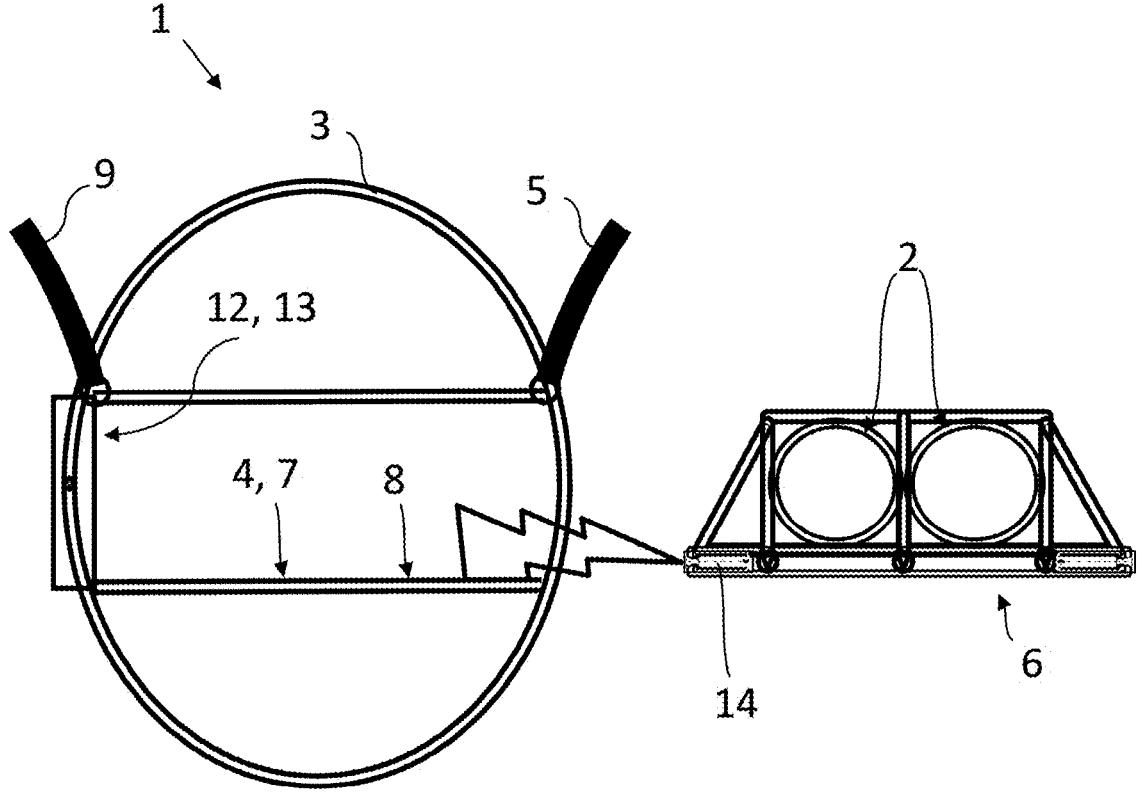
FIG. 4 shows a schematic illustration of the aircraft fuselage of FIG. 3, wherein the sled device has been shot/blown out away from the aircraft fuselage.

FIGS. 3 and 4 show a schematic illustration of an aircraft fuselage 1 according to a further embodiment of the disclosure herein including the sled device 6 of FIG. 2.

Specifically, in FIG. 3 the sled 6 device of FIG. 2 is released, wherein the sled device 6 has been shot/blown out away from the aircraft fuselage in FIG. 4.

The aircraft fuselage 1 of FIGS. 3 and 4 differ from the aircraft fuselage 1 of FIG. 1 in that a section of the aircraft fuselage 1 is lined with a fire resistant lining 10 for retaining flames and a section of an inner side of the outer structure 3 comprises a flame deflector shielding 11. In particular, these section corresponds to an inner side of the first 5 and second release door 9 as well as the walls that surround the sled device 6.

Further, a flameless venting device 12 for retaining flames is placed on an inner side of both the first 5 and second openable release door 9 and configured to cover an opening 13 in the outer structure 3 when the first 5 or second release door 9 is open, as it is illustrated in FIG. 3. The flameless venting device 12 at the first release door 5 is opened or destroyed when the sled device 6 leaves the aircraft fuselage 1 through this opening 13. Therefore, the flameless venting device 12 at the first release door 5 has been penetrated in the illustrated situation of FIGS. 3 and 4. The flameless venting device 12 at the second release door 9 remains during releasing the sled device 6 through the first release door 5.

Figure 5:
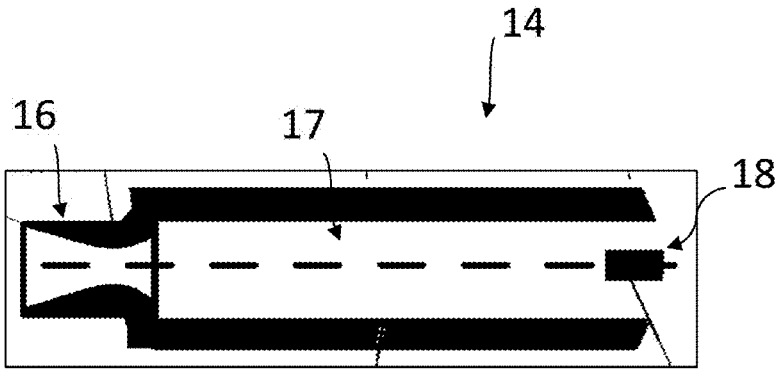
FIG. 5 shows a schematic illustration of a solid propellant rocket as it is used for accelerating a sled device according to a further embodiment of the disclosure herein.

FIG. 5 shows a schematic illustration of a solid propellant rocket 14 as it is used for accelerating a sled device 6 according to a further embodiment of the disclosure herein. The solid propellant rocket 14 is an example for the accelerator 14 as it can be used for the sled device of FIG. 2, for example.

The solid propellant rocket 14 or solid rocket is a rocket with a rocket engine that uses solid propellants like fuel and oxidizer. The solid propellant rocket 14 comprises a nozzle 16, pressure chamber 17 and an igniter 18. A solid grain mass burns in a predictable fashion to produce exhaust gases. A nozzle 16 dimensions are calculated to maintain a design chamber pressure, while producing thrust from the exhaust gases. Once ignited, a simple solid rocket 14 cannot be shut off, because it contains all the ingredients necessary for combustion within the pressure chamber 17 in which they are burned. Modern designs may also include a steerable nozzle for guidance, avionics, recovery hardware like parachutes, self-destruct mechanisms, APUs, controllable tactical motors, controllable divert and attitude control motors, and thermal management materials.

An advantage of the solid propellant rocket 14 is that a force for the acceleration of the sled device 6 does not need to be supported by the aircraft fuselage 1. Therefore, the force for the acceleration of the sled device 6 is not transmitted to the outer structure 3 and hence the aircraft fuselage 1 is not pushed away. In an embodiment with a second release door 9, the second release door 9 can be opened in addition to the first release door 5 such that the exhaust gases can exit the aircraft fuselage 1 better.

Figures 6, 7:
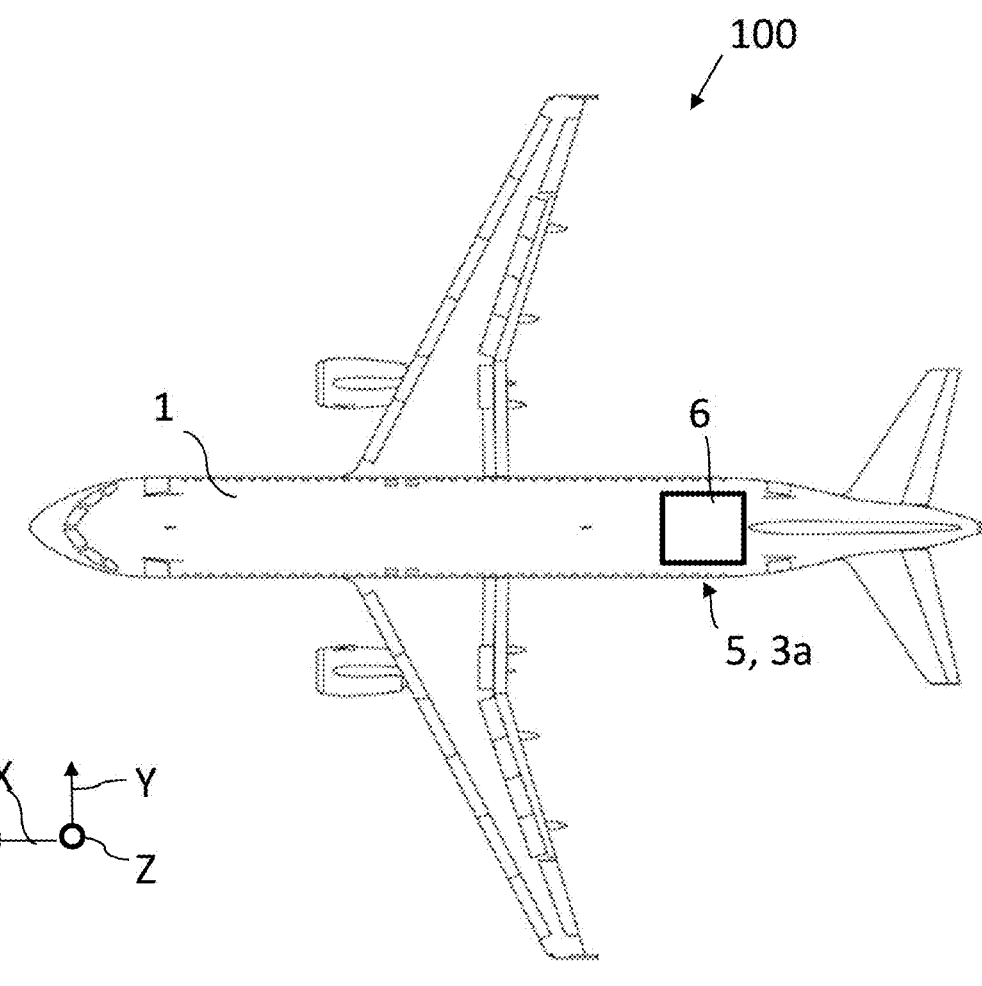
FIG. 6 shows a schematic illustration of an aircraft according to a further embodiment of the disclosure herein.
FIG. 7 shows a flow chart for a method for releasing a fuel tank from inside the aircraft fuselage in case of emergency according to a further embodiment of the disclosure herein.

FIG. 6 shows a schematic illustration of an aircraft 100 according to a further embodiment of the disclosure herein. Specifically, the aircraft 100 is configured as a passenger or cargo aircraft.

The aircraft 100 comprises an aircraft fuselage, in particular an aircraft fuselage 1 according to FIG. 1, 3 or 4, and a sled device 6 for carrying a fuel tank. The sled device 6 is releasably secured by the mounting device 4 in an inside, in particular in an inner tank compartment, of the outer structure 3. The first openable releasable door 5 is located on a lateral side 3a of the aircraft fuselage 1. For example, the first releasable door 5 is located on a left hand side of the aircraft 100 with regard to a flight direction and longitudinal axis X of the aircraft 100.

Here, the aircraft 100 comprises one sled device 6 but is not limited to that number. The aircraft 100 can also comprise two or more sled devices 6. For example, the two or more sled devices 6 are arranged behind each other and/or above each other such that each sled device 6 can be released from the aircraft fuselage 1 to both opposite lateral sides 3a, for instance the left hand side or the right hand side, when the aircraft fuselage 1 comprises a second openable release door 9.

The fuel tank is fluidly connected to a standard fueling and transfer line of the aircraft 100 when secured by the mounting device 4. The fuel tank supplies an engine of the aircraft 100 with fuel. The fuel can be kerosene or hydrogen, for example. Therefore, the fuel tank may be configured as a cryogenic tank for storing hydrogen.

Further, the aircraft 100 comprises a second fuel tank which is independent from the fuel tank and integrated into a wing of the aircraft 100. The second fuel tank is configured for storing kerosene, for example. The fuel tank can store hydrogen and the second fuel tank can store kerosene, for example. Alternatively, the fuel tank and the second fuel tank store the same fuel.

FIG. 7 shows a flow chart for a method M for releasing a fuel tank 2 from inside the aircraft fuselage 1 in case of emergency according to a further embodiment of the disclosure herein. In particular, the fuel tank 2 is released from inside the aircraft fuselage 1 according to FIG. 1, 3 or 4.

The method M comprises the steps of detecting M0, switching M1, opening M2, disconnecting M3 and closing M4.

The method M could start with detecting M0 a leakage of the fuel tank 2. The leakage can be detected by a user or a hydrogen detection system positioned at or coupled to the fuel tank 2.

In the optional step of switching M1 a fuel supply from the fuel tank 2 is switched to a second fuel tank which is independent from the fuel tank 2. Thereby, the second fuel tank is not to be released. Of course, the fuel supply does not need to be switched from the fuel tank 2 to the second fuel tank when the fuel tank 2 does not supply fuel at the moment of starting the method M.

In the step of opening M2 a first release door 5 is opened. The first release door 5 separates an inside from an outside of an outer structure 3 of the aircraft fuselage 1. For example, the hydrogen detection system may activate the quick release element and the first release door. Furthermore, the quick release element and/or the first release door can be activated or controlled by an activation system or a control and steering unit, respectively. In case the aircraft fuselage 1 comprises a second openable release door 9 the step of opening M2 can also include opening the second release door 9. The first and second release door can be opened together, meaning at the same time, or one by one.

In the step of disconnecting M3 a sled device 6 for carrying the fuel tank 2 is disconnected. The sled device 6 is releasably secured by a mounting device 4 in the inside of the outer structure 3 from the mounting device 4 such that the sled device 6 releases the aircraft fuselage 1 through the open first release door 5. Additionally, the sled device 6 can be accelerated relative to the aircraft fuselage 1 by an accelerator 14. Thus, the sled device 6 can be shot/blown out away from the aircraft fuselage 1. For example, the accelerator 14 can be configured as a solid propellant rocket which is ignited.

In the further step of closing M4 the first release door 5 is re-closed after the fuel tank 2 has released the aircraft fuselage 1. In particular, the first release door 5 is closed during flight with a regular flight speed. Furthermore, the first release door 5 can be closed in any desired altitude. Therefore, a drive mechanism of the first release door 5 is designed to overcome the higher loads.

In the detailed description above, various features have been combined in one or more examples in order to improve the rigorousness of the illustration. However, it should be clear in this case that the above description is of merely illustrative but in no way restrictive nature. It serves to cover all alternatives, modifications and equivalents of the various features and example embodiments. Many other examples will be immediately and directly clear to a person skilled in the art on the basis of his knowledge in the art in consideration of the above description.

The example embodiments have been chosen and described in order to be able to present the principles underlying the disclosure herein and their application possibilities in practice in the best possible way. As a result, those skilled in the art can optimally modify and utilize the disclosure herein and its various example embodiments with regard to the intended purpose of use. In the claims and the description, the terms "including" and "having" are used as neutral linguistic concepts for the corresponding terms "comprising".

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE LIST

1 aircraft fuselage
2 fuel tank
3 outer structure
3a lateral side
4 mounting device
5 first release door
6 sled device
7 rail system
8 reversible quick release element
9 second release door
10 fire resistant lining
11 flame deflector shielding
12 flameless venting device
13 opening
14 accelerator
15 roller
16 nozzle
17 pressure chamber
18 igniter
100 aircraft
X longitudinal axis
M method
M0 detecting
M1 switching
M2 opening
M3 disconnecting
M4 closing

The invention claimed is:

1. An aircraft fuselage for releasing one or more hydrogen fuel tanks from inside the aircraft fuselage in case of detection of a hydrogen leak, the aircraft fuselage comprising:

an outer structure;

a sled device for carrying the one or more hydrogen fuel tanks in an inside of the outer structure;

a mounting device configured to releasably secure the sled device; and a first release door, which is openable, positioned on a lateral side of the outer structure, and separates the inside from an outside of the outer structure, wherein the first release door is positioned in relation to the mounting device such that the one or more hydrogen fuel tanks are configured to be released through the first release door when the mounting device releases the sled device;

the sled device comprising a first accelerator and a second accelerator; and the first accelerator and the second accelerator being attached to the sled device at opposite end regions of the sled device from each other and oriented in opposite directions from each other, such that, when the first accelerator is activated, the sled device can be ejected from the aircraft fuselage through the first release door and, when the second accelerator is activated, the sled device can be ejected from the aircraft fuselage through a second release door.

2. The aircraft fuselage according to claim 1, wherein the mounting device comprises a rail system for guiding the sled device.

3. The aircraft fuselage according to claim 1, wherein the mounting device comprises a reversible quick release element which is configured to lock the sled device in a secured status and is configured to be driven electro-mechanically, magnetically, hydraulically, or pneumatically to release the sled device.

4. The aircraft fuselage according to claim 1, wherein the first release door is hinged to the outer structure and can be opened by a hydraulic, electro-mechanical, or pneumatic pivot mechanism, wherein a hinge axis of the first release door substantially corresponds to a longitudinal axis of the aircraft fuselage.

5. The aircraft fuselage according to claim 1, comprising a second release door that is openable and positioned on an opposite side of the outer structure from the first release door.

6. The aircraft fuselage according to claim 5, wherein at least one of the first release door and the second release door is configured to be re-closable, or re-closable during flight.

7. A passenger or cargo aircraft comprising:
the aircraft fuselage according to claim 1;
wherein the sled device is releasably secured by the mounting device inside the outer structure; and
wherein, when the sled device is released by the mounting device upon detection of the hydrogen leak, the sled device and the one or more hydrogen fuel tanks are configured for ejection from the aircraft fuselage.

8. The aircraft according to claim 7, comprising one or more hydrogen fuel tanks fluidly connected to a fueling and transfer line of the aircraft when the one or more hydrogen fuel tanks are secured by the mounting device.

9. The aircraft according to claim 1, wherein the first and or second accelerator comprises a rocket.

10. The aircraft according to claim 7, wherein:
the aircraft fuselage comprises a second release door that is openable and positioned on an opposite side of the outer structure from the first release door.

11. A method for releasing one or more hydrogen fuel tanks from inside of an aircraft fuselage in case of detection of a hydrogen leak, the method comprising:
releasably securing, using a mounting device in an inside of an outer structure of the aircraft fuselage, a sled device carrying the one or more hydrogen fuel tanks in the inside of the outer structure of the aircraft fuselage;
detecting an occurrence of the hydrogen leak within the aircraft fuselage;
opening a first release door, which is positioned on a lateral side of the outer structure of the aircraft fuselage and separates the inside from an outside of the outer structure of the aircraft fuselage; and
when the occurrence of the hydrogen leak is detected within the aircraft fuselage, using the mounting device to disconnect the sled device from the aircraft fuselage, such that the sled device, as well as the one or more hydrogen fuel tanks attached to the sled device, can be released from the aircraft fuselage through the open first release door;
the sled device comprising a first accelerator and a second accelerator; and
the first accelerator and the second accelerator being attached to the sled device at opposite end regions of the sled device from each other and oriented in opposite directions from each other, such that, when the first accelerator is activated, the sled device is ejected from the aircraft fuselage through the first release door, and, when the second accelerator is activated, the sled device is ejected from the aircraft fuselage through a second release door.

12. The method according to claim 11, further comprising closing the first release door after the fuel tank has released from the aircraft fuselage.

13. The method according to claim 11, wherein disconnecting includes accelerating the sled device relative to the aircraft fuselage by the first and or second accelerator.

14. The aircraft according to claim 7, wherein the first and or second accelerator comprises a rocket.

15. The method according to claim 11, wherein the first accelerator comprises a rocket and the second accelerator comprises a rocket.

16. The aircraft according to claim 9, wherein the rocket is a solid propellant rocket.

* * * * *